(12) United States Patent
Muramoto et al.

(10) Patent No.: US 6,334,940 B1
(45) Date of Patent: Jan. 1, 2002

(54) PLURAL LAYERED ELECTRODEPOSITED COATING AND METHOD FOR FORMING MULTI LAYERED COATING CONTAINING THE SAME

(75) Inventors: Hisaichi Muramoto, Hyogo-ken; Takefumi Yamamoto, Osaka-fu, both of (JP)

(73) Assignee: Nippon Paint Co., Ltd., Osaka-fu (JP)

( * ) Notice: Subject to any disclaimer, the term of this patent is extended or adjusted under 35 U.S.C. 154(b) by 0 days.

(21) Appl. No.: 09/714,535

(22) Filed: Nov. 17, 2000

(30) Foreign Application Priority Data

Nov. 18, 1999 (JP) ............................................. 11-328111

(51) Int. Cl.7 ............................................... C25D 13/12
(52) U.S. Cl. ....................................... 204/488; 204/486
(58) Field of Search .................................. 204/484, 488

(56) References Cited

U.S. PATENT DOCUMENTS 5,177,125 A   1/1993   Schwerzel et al. ....... 204/181.4

OTHER PUBLICATIONS

Patent Abstracts of Japan, vol. 1997, No. 4, Apr. 30, 1997 (JP 83–333528 A).
Patent Abstracts of Japan, vol. 012, No. 421 (C–541), Nov. 8, 1988 (JP 63–153297 A).
Patent Abstracts of Japan, vol. 002, No. 038 (C–006), Mar. 14, 1978 (JP 52–140522 A).
Patent Abstracts of Japan, vol. 013, No. 169 (C–587), Apr. 21, 1989 (JP 63–317695 A).

*Primary Examiner*—Kishor Mayekar
(74) *Attorney, Agent, or Firm*—Wenderoth, Lind & Ponack, LLP

(57) ABSTRACT

Disclosed is a coating method of intermediate-coating-less, which sufficiently keeps excellent appearance, weather resistance and corrosion resistance equal to a three layer coating in conventional technology. The method of the present invention comprises:

electrocoating an aqueous paint composition comprising at least two sort of resins which are insoluble with each other, a curing agent and a pigment, on an electrically conductive substrate, heating it to form a layer separation, and then curing to form a plural layered cured coating having at least two layers, wherein a concentration of the pigment is distributed such that a pigment concentration (a) in the resin layer directly contacting air is relatively higher than a pigment concentration (b) in the resin layer directly contacting the electrically conductive substrate.

16 Claims, No Drawings

PLURAL LAYERED ELECTRODEPOSITED COATING AND METHOD FOR FORMING MULTI LAYERED COATING CONTAINING THE SAME

FIELD OF THE INVENTION

The present invention relates an intermediate-coating-less system (two-coat system) in which a top coating paint is directly coated on an electrodeposited coating, which is useful for paint industry, especially automobile coating. In detail, it relates a method for forming a plural layered electrodeposited coating and a method for forming a multi-layered coating containing this electrodeposited coating, which has excellent appearance, solvent resistance, weather resistance and corrosion resistance equal to a three layer coating by pigment alignment and which has a important roll on structuring a novel coating system which accomplishes decreasing coating step, reducing cost and decreasing damage to environment.

BACKGROUND OF THE INVENTION

Lately, in paint field, especially in the field of automobile coating, decreasing coating step is strongly required in order to solve the problems of resource saving, cost-saving and decreasing damage to environment (VOC and HAPs, etc.). Specifically, there is desired a method for forming a coated film that, when compared with three layer coating having an electrodeposited primer coating, an intermediate coating and a top coating which are a conventional coating and finish procedures of automobile, the intermediate-coating-less (two-coat system) in which top coating is carried out directly on an electrodeposited primer coating decreases number of coating steps, and keeps excellent appearance, cohesiveness to top coating, weather resistance and corrosion resistance equal to the three layer coating.

Regarding plural layered electrodeposited coating by way of the intermediate-coating-less system, Japanese Patent Publication No. 2-33069 discloses an electrocoating composition which forms two-layered coating having thick film. This invention is directed to a composition wherein a cationic acryl resin having a softening point of 80° C. or more and a cationic phenol type epoxy resin having a softening point of 75° C. or less are contained at a ratio of 1 to 30:1 by weight. It is described that the coated film formed from this composition has a two layer structure composed of an epoxy type underlayer having good corrosion resistance and an acryl type upper layer having good weather resistance.

Japanese Patent Publication No. 6-99652 also discloses that a two layered electrodeposited coating can be formed from an epoxy type cation electrodepositable resin and a non-ionic film-forming resin, which have a surface tension of a given region In addition, Japanese Laid-Open Patent Application Nos. 8-333528 and 10-292131 disclose that a two layered electrodeposited coating can be formed from an amine modified epoxy type cation resin, a (self-crosslinking) acryl type cationic resin which has lower solubility parameter than the former resin, and a block polyisocyanate curing agent.

OBJECT OF THE INVENTION

The above invention of each reference merely shows a means for separating resins in an electrodeposited coating, but does not describe the means for providing an electrodeposited coating having excellent appearance and excellent cohesiveness to a top coating, equal to the three layer coating.

An object of the present invention is to provide a coating method of intermediate-coating-less, which sufficiently keeps excellent appearance, weather resistance and corrosion resistance equal to a three layer coating in conventional technology.

DETAILED DESCRIPTION OF THE INVENTION

The method for forming a plural layered electrodeposited coating of the present invention comprises;

electrocoating an aqueous paint composition comprising at least two sort of resins which are insoluble with each other, a curing agent and a pigment, on an electrically conductive substrate, heating it to form a layer separation, and then curing to form a plural layered cured coating having at least two layers, wherein a concentration of the pigment is distributed such that a pigment concentration (a) in the resin layer directly contacting air is relatively higher than a pigment concentration (b) in the resin layer directly contacting the electrically conductive substrate. This method is suitable for cationic electrocoating that is carried out by connecting an electrically conductive substrate to a cathode electrode.

In the method of the present invention, a solubility parameter ($\delta a$) of a resin component constituting the above-mentioned resin layer directly contacting air (hereinafter described as resin component A) and a solubility parameter ($\delta b$) of a resin component constituting the resin layer directly contacting the electrically conductive substrate (hereinafter described as resin component B) have a relation of $(\delta b - \delta a) \geq 1.0$. Preferably, the above resin component B is a cation-modified epoxy resin. The above resin component A can preferably be an anionic polyester resin, more preferably contains a tertiary carboxyl group in a molecule. A mixing ratio of the above resin component A and the above resin component B in the above aqueous paint composition is preferably within the range of 70/30 to 30/70 by weight.

In the method of the present invention, a weight ratio (P/V) of a weight (V) of total vehicle component forming the plural layered cured coating except pigment, to a weight (P) of total pigment in the above plural layered cured coating is preferably within the range of 1/10 to 1/2. Preferably at least one of the above pigment is titanium dioxide.

The aqueous paint composition is preferably obtained by dispersing the pigment by using the resin component constituting the resin layer directly contacting air to obtain a pigment dispersion which is dispersed is an aqueous medium containing the cationic pigment-dispersing resin to form an aqueous pigment-dispersed paste, and then mixing the aqueous pigment-dispersed paste with the curing agent and the resin component constituting the resin layer directly contacting the electrically conductive substrate.

A solubility parameter ($\delta c$) of the above cationic dispersing resin is preferably present between the solubility parameters $\delta a$ and $\delta b$. The above cationic dispersing resin is preferably a cation-modified novolak type epoxy resin.

The curing agent contained in the electrodeposition composition used in the method for forming the plural layered electrodeposited coating of the present invention is preferably a blocked polyisocyanate and has a solubility parameter ($\delta i$) of between said solubility parameters $\delta a$ and $\delta b$. The above curing agent may also comprise two curing agents having different solubility parameter, in which one is a melamine resin, a difference between its solubility parameter (δm) and the solubility parameter (δa) of the resin component constituting the resin layer directly contacting air being less than 0.5, the other is a blocked polyisocyanate, a difference between its solubility parameter (δi) and the solubility parameter (δb) of the resin component constituting the resin layer directly contacting the electrically conductive substrate being less than 0.5.

The method for forming the multi-layered coating of the present invention further includes a step of coating a functional clear paint or top coating paint on the plural layered electrodeposited coating obtained according to the above method, and baking. It is particularly desired that the plural layered electrodeposited coating is uncured but preheated at a temperature of less than curing temperature, and then coating the functional clear paint or top coating paint in wet-on-wet, followed by baking the electropainted coating and the top coating simultaneously.

The method for forming a plural layered electrocoated coating of the present invention comprises;
  electrocoating an aqueous paint composition comprising at least two sort of resins which are insoluble with each other, a curing agent and a pigment, on an electrically conductive substrate,
  heating it to form a layer separation, and then
  curing to form a plural layered cured coating having at least two layers,
  wherein a concentration of the pigment is distributed such that a pigment concentration (a) in the resin layer directly contacting air is relatively higher than a pigment concentration (b) in the resin layer directly contacting the electrically conductive substrate.

An aqueous paint composition used in the method for forming the plural layered electrodeposited coating of the present invention will be explained. The aqueous paint composition contains at least two resin components that are insoluble with each other, a curing agent and a pigment. The above two resin components are composed of a resin component constituting the resin layer directly contacting air (resin component A) and a resin component constituting the resin layer directly contacting an electrically conductive (resin component B).

The term "insoluble" used herein includes not only one that is not soluble at all, but one that shows very poor solubility.

A solubility parameter (δa) of the above resin component A and a solubility parameter (δb) of the above resin component B preferably satisfy a relation of (δb−δa)≧1.0.

It is generally believed that if a difference of solubility parameter(δ) between two of resins is 0.5 or more, a coating obtained from these two resins generates layer-separating construction. However, in order to form a coating construction in which layer separation is generated clearly as the present invention, a difference of the solubility parameter of at least 1.0 is desired. The use of the two resin components having solubility parameters as defined above makes it possible to secure sufficient insolubility, to form an electrodeposited coating having a plural layered construction.

The above "solubility parameter δ" is generally called by persons skilled in the art as SP (solubility parameter), which shows a standard indicating degree of hydrophilicity or hydrophobicity and can be an important standard to judge solubility between resins. A value of SP can be determined by a method called as turbidimetric method, which is well known to the art.

The above resin component A is preferably an anionic polyester resin. Polyester resin is generally obtained by dehydrating polybasic acid and polyol, while an anionic polyester resin means a polyester resin that has an acid group. An amount of the acid group is preferably within the range of 3 to 20, more preferably 5 to 15 by acid value. If an acid value is less than 3, adhesion with a top coating may be inferior. If it is more than 20, it shows curing defects when combined with blocked polyasocyanate curing agent and causes difficulty in making pigment paste.

A hydroxyl value may preferably be within the range of 50 to 150. If a hydroxyl value is less than 50, curing defect in coating may occur, while if it value is more than 150, excess hydroxyl groups remain in a coated film after curing to result in decrease of water resistance. Number-average molecular weight is preferably within the range of 1,000 to 10,000. If number-average molecular weight is less than 1,000, properties, such as solvent resistance of a cured and formed coating are inferior. While values of more than 10,000 make it difficult to handle on operation, such as emulsification and dispersion of an obtained resin, as well as deteriorate appearance of the resulting electrodeposited coating. Additionally, the anionic polyester resin may be one type, but can be two or more types to make balance of performance of a coating.

The above anionic polyester resin is produced by dehydrating polyol, (such as, neopentyl glycol, trimethylol propane, ethylene glycol, diethylene glycol, propylene glycol, 1,6-hexanediol, glycerin and pentaerythritol) and polybasic acid (such as, phthalic acid, isophthalic acid, trimellitic acid, terephthalic acid, pyromellitic acid, hexahydrophthalic acid, succinic acid, adipic acid, and sebacic acid and anhydrides thereof), or if necessary, lactones, such as δ-butyrolactone, and ε-caprolactone, any types of saturated and/or unsaturated fatty acids as modified, such as coconut oil fatty acid, tung tree oil fatty acid, soybean oil fatty acid, and linseed oil fatty acid and mono-, di-, or tri-glycerides thereof, and Carjurer-E-10 (monoepoxide having a branched alkyl group with 10 carbon atoms, available from Shell Chem. Co.) according to conventional methods.

The above anionic polyester resin may contain a urethane bond in suitable quantity in part. An introduction of the urethane bond can be carried out by reacting diisocyanates, such as 4,4'-diphenylmethane diisocyanate, tolylene diisocyanate, hexamethylene diisocyanate and isophorone diisocyanate, with a hydroxyl group of polyester polyol which has hydroxyl groups at both ends of a molecular chain, such as δ-butyrolactone, or ε-caprolactone to form urethane bonds, and partly extending chains. The above resin is used as a part of the above polyol components.

In addition, the above anionic polyester resin preferably contains a tertiary carboxyl group in a molecule. The tertiary carboxyl group is one in which hydrogen is not bonded at all to a carbon atom directly bonded with a carboxyl group. Since the tertiary carboxyl group has a low activity as acid group, it is introduced into anionic polyester resin to easily control SP value. The anionic polyester resin contains a tertiary carboxyl group in a molecule, so that interaction between acid groups in the resins lowers to enhance heat flow property of a coating. Accordingly, smoothness of the coating during heating and curing is secured so as to improve appearance, whatever pigment dispersibity varies. Further, when melamine resin is used as a curing agent, it is expected to act as catalyst in the curing reaction of the melamine resin.

The anionic polyester resin containing a tertiary carboxyl group in a molecule can be produced by using a diol compound containing a tertiary carboxyl group, such as 2,2'-dimethylol propionic acid, 2,2'-dimethylol butanic acid, 2,2'-dimethylol hexanic acid, 2,2'-dimethylol octanic acid or 2,2'-dimethylol decanic acid as a portion of the above polyol component. An amount of the diol compound containing a tertiary carboxyl group is controlled such that the above acid value, i.e. a proportion of tertiary carboxyl group to a total acid value of anionic polyester resin, is preferably 80% or more, more preferably, almost 100%

The above anionic polyester resin, if necessary, can also be made to be a self-crosslinking type resin by an addition reaction with a half-blocked diisocyanate compound or a partial condensation with a melamine resin. The self-crosslinked resin can be suitably used in the present invention, because of superiority in curing reactivity.

It is, however, necessary that the above resin component B is a resin that imparts corrosion resistance to an electrically conductive substrate. Examples of the resins are cation-modified epoxy resin, which is well known in the field of cation electrocoating paint and can be also suitably used in the present invention. The cation-modified epoxy resin preferably has a hydroxil value of 50 to 250. If the hydroxyl group value is less than 50, curing defect would occur, while if the hydroxyl group value is more than 250, excess hydroxyl groups remain in a coating after curing to lower water resistance. A number-average molecular weight is preferably within the range of 1,500 to 5,000. If number-average molecular weights are less than 1,500, physical properties of the cured coating, such as solvent resistance and corrosion resistance may be inferior. Values of more than 5000 may make it difficult to control viscosity of a resin solution to cause difficulty in synthesizing, and may be difficult in handling on operation, such as emulsification and dispersion of an obtained resin. In addition, because of high viscosity, flow property during heating and curing is inferior, and as a result, appearance of a coating may be significantly damaged. A softening point of the resin is preferably 80° C. or more, more preferably 100° C. or more, which is preferably used for achieving the objects of the present invention. Additionally, the softening point of resin can be determined based on JIS-K-5665.

The cation-modified epoxy resin is generally produced by ring-opening epoxy rings in a molecule of the starting material resin by the reaction with amines, such as primary amine, secondary amine, or tertiary amine. A typical example of the starting material resin is polyphenol polyglycidyl ether type epoxy resin, which is a reaction product of a polycyclic phenol compound, such as bisphenol-A, bisphenol-F, bisphenol-S, phenol novolak, and cresol novolak, with epichlorohydrin. Another example of starting material resin includes an epoxy resin having an oxazolidone ring containing epoxy resin as described in Japanese Laid Opened Publication No. 5-306327. This epoxy resin is obtained by reacting a diisoscyanate compound or a bis-urethane compound (obtained by blocking an NCO group of a diisocyanate compound with a lower alcohol, such as methanol or ethanol) with epichlorohydrin.

The above starting material resin, before the ring-opening reaction of epoxy rings with amines, can be chain-extended by using difunctional polyester polyol, polyether polyol, bisphenol, dibasic carboxylic acid and the like. Similarly, before the ring-opening reaction of epoxy rings with amines, a monohydroxyl compound, such as 2-ethylhexanol, nonylphenol, ethylene glycol mono-2-ethylhexylether, and propylene glycol mono-2-ethylhexylether can also be added to a part of epoxy rings, in order to control molecular weight or amine equivalent and to improve of heat flow property etc.

Examples of the amines which can be used for ring-opening an epoxy group and introducing an amino group, include a primary amine, a secondary amine, or an acid salt of tertiary amine, such as butylamine, octylamine, diethhylamine, dibutylamine, methylbutylamine, monoethanolamine, diethanolamine, N-methylethanolamine, an acid salt of triethylamine and an acid salt of N, N-dimethylethanolamine. Also, a secondary amine having ketimine blocked primary amino group, such as aminoethylethanolamine methylisobutylketimine can be also used. In order to ring-open all epoxy rings, it is required to react the amines with epoxy rings in at least same equivalent.

In the method for introducing cationic property into an epoxy resin, it is also preferably that an epoxy ring is modified with a sulfonium salt as described in Japanese Laid Open Publication No. 11-209663.

A mixing ratio of the resin component A and the resin component B in the aqueous paint composition is preferably within the range of 70/30 to 30/70, more preferably 60/40 to 40/60 by weight. Ratios outside do not make plural layer structure and often generate a sea-island structure (or micro-domain structure) in which the resin with higher mixing ratio forms a continuous layer, the resin with lower mixing ratio forms a dispersing layer. Even if a layer structure is generated, either of two layers has extremely thin thickness and therefore is inferior in either weather resistance or corrosion resistance.

Then, a curing agent contained in the aqueous paint composition used in the method of the present invention may be any types, as long as it cures each component, but a blocked polyisocyanate that has been suitable used for curing agent of an electrodeposition resin is used. In the method of the present invention, there is either a case in which only blocked polyisocyanate is used as curing agent or a case in which blocked poly isocyanate and melamine resin is used as a combination of curing agent.

When only blocked polyisocyanates are used as a curing agent, a solubility parameter ($\delta i$) of the blocked polyisocyanate preferably resides between a solubility parameter of the above resin component A ($\delta a$) and a solubility parameter of the above resin component B ($\delta b$.), i.e. $\delta a < \delta i < \delta b$. Thus, controlling the solubility parameter of the blocked polyisocyanate makes it possible to distribute and dissolve blocked polyisocyanates into each layer after forming two layer separation, and to compromise both curing property of the layer containing the resin component A and simultaneous curing properties of the layer containing the resin component B.

When a combination of blocked polyisocyanate and melamine resin are used as a curing agent, the following condition regarding solubility parameters needs be satisfied. That is, it is desired that solubility parameters of blocked polyisocyanate and melamine resins are different from each other, a difference between a solubility parameter($\delta m$) of melamine resin and a solubility parameter ($\delta a$)of the above resin component A is less than 0.5, and a difference between a solubility parameter($\delta i$) of blocked polyisocyanate and a solubility parameter ($\delta b$)of the above resin component B is less than 0.5

If the above difference of the solubility parameters is more than 0.5, when heating and curing the plural layered electrocoated film, an amount of the curing agent transferring to the resin layer formed by each resin component is insufficient, and curing defect may occur.

When only blocked poly isocyanates are used, an amount of the curing agent in the above aqueous paint composition is preferably within the range of 15 to 40 weight % based on a total amount of the resin components A and B, in view of coating performance or compatibility with top coating. If an amount is less than 15 weight %, curing defect occurs and physical properties of a coating, such as mechanical strength, may decrease. In addition, appearance defect may happen, for example, a coating is damaged by paint thinner when coating top coating. If an amount is more than 40 weight %, overcuring may occur and provide defects of physical properties of a coating, such as poor impact resistance. Additionally, the blocked polycyanate may be a combination of plural types, in view of physical properties of a coating and controlling of curing agent.

On the other hand, when blocked polyisocyanate and melamine resins are combined, a weight ratio of the above melamine resins to a weight of the resin component A and a weight ratio of a above blocked polyisocyanate to a weight of the resin component B are both preferably within the range of 15 to 40 weight %. If the ratio is less than 15 weight %, curing defect of a coating would occur and lower physical properties of a coating, such as mechanical strength. In addition, appearance defect may happen, for example, a coating is damaged by paint thinner when coating top coating.

If the ratio is more than 40 weight %, overcuring may occur to lead defects of the physical properties of a coating film, such as impact resistance. Care should be taken therefore.

Additionally, the above blocked polyisocyanate is one that is obtained by blocking polyisocyanate with a suitablebe blocking agent. It is desired that the above blocked polyisocyanate previously are blocked by one or more types of the blocking agents. A blocking ratio can preferably be 100% in order to secure storage stability of a paint, unless it is reacted with the resin component A or B.

Examples of the polyisocyanates are aliphatic diisocyanates, such as hexamethylene diisocyanate (including trimmer), tetramethylene diisocyanate, and trimethylhexamethylene diisocyanate; alicyclic polyisocyanate, such as isophoron diisocyanate and 4,4'-methylenebis (cyclohexyl isocyanate); aromatic diisocyanates, such as 4,4'-diphenylmethane diisocyanate, tolylene diisocyanate and xylene diisocyanate. Examples of the above blocking agent are monovalent alkyl (or aromatic) alcohols, such as n-butanol, n-hexyl alcohol, 2-ethylhexanol, lauryl alcohol, phenol carbinol and methyl phenyl carbinol; cellosolves, such as ethylene glycol monohexyl ether and ethylene glycol mono-2-ethylhexyl ether; phenols, such as phenol, para-t-butyl phenol and cresol; oximes, such as dimethyl ketoxime, methylethyl ketoxime, methyl isobutyl ketoxime, methylamyl ketoxime and cyclohexanone oxime; and lactams represented by ε-caprolactam and γ-butyrolactam, lactams being preferably used. Especially, in view of curing property of resins, the blocking agents of oximes and lactams are suitable used, because they dissociate at low temperature.

Melamine resins are those that are obtained by condensing melamine, benzoguanamine, urea etc. with formaldehyde, or then etherifying with a lower monovalent alcohol, such as methanol or butanol. These are curing agents for paint, and are well known to those skilled in the art. Since the melamine resin ($\delta m$) changes its solubility parameter depending on a proportion making methanol to a melamine backbone and type and amount of an alcohol used in etherification, the melamine resin can be selected on account of the performance.

A pigment contained in the aqueous paint composition used in the method of the present invention is not particularly limited if it is usually used in paint, but is preferably a color pigment, in view that weather resistance is improved and concealment is secured. Titanium dioxide is particularly suitable for the present invention, because it is excellent in color concealment and cheap. Distributing titanium dioxide to the resin layer directly contacting air in the plural layered electrocoated coating makes it possible to increase interception of light toward inside. As a result, weather resistance of the plural layered electrocoated coating can be improved.

In addition to titanium dioxide, inorganic pigments, such as iron oxide and carbon black; organic pigments, such as phthalocyanine blue, phthalocyanine green, carbazole violet, anthra pyrimidine yellow, flavanthrone yellow, isoindoline yellow, indanthrone blue and quinacridone violet; and if necessary, other fillers, such as clay, talc, or kaoline can be formulated, based on the purpose of paint.

The above pigment, if it is represented by a ratio (P/V) of a total amount of pigments (P) to the weight of total vehicle component (V) to a weight in the aqueous paint composition is preferably within the range of $\frac{1}{10}$ to $\frac{1}{2}$. In this context, the vehicle component except pigments means total solid component constituting paint except pigments (i.e. main resin component which are insoluble with each other, curing agent and pigment dispersing resins). If the PN is less than $\frac{1}{10}$, pigment is not contained sufficiently and reduce prevention of corrosion factors, such as light and water, to result in deterioration of weather resistance and corrosion resistance of practical level. If PN is more than $\frac{1}{2}$, excess amount of pigment may cause increase of viscosity when curing and reduce flow property to provide poor appearance.

The above aqueous paint composition can be obtained by mixing and dispersing the above component respectively by using methods which are well known to the art, but is preferably produced by a method as follow. That is the pigment is dispersed with the resin component A to form of a pigment dispersant which is then dispersed in an aqueous dispersion containing the cationic dispersing resin to obtain an aqueous pigment dispersed paste. The obtained paste is mixed with the above resin component B and the curing agent.

The above cationic dispersing resin can be one that has generally been used as a dispersing resin for cationic electrocoating paint, but it is preferred that its solubility parameter ($\delta c$) is present between a solubility parameter ($\delta a$) of the resin component A and a solubility parameter ($\delta b$) of the resin component B. It is believed that the control of the solubility parameter allows cationic dispersing resin to absorb to the resin component A (being a resin for dispersion), and to disperse pigments and the resin component A covering the pigment surfaces in water together during forming the aqueous pigment dispersed paste, but during forming a coating film, particularly baking, a cationic dispersing resin moves around interlayer, or a part of it is distributed to both of layers.

A concrete example of the above cationic dispersing resin is preferably cation-modified novolak type epoxy resin. The cation-modified novolak type epoxy resin can be obtained by, for example, changing all or a portion of epoxy groups of cresol novolak type epoxy resin or phenol novolak type epoxy resin to tertiary sulfonium salt, quaternary ammonium salt or quaternary phosphate by an omnium-making method which is well known. These cation-modified resins can be dissolved or dispersed in an aqueous medium as they are. Moreover, the cation-modified resin can be also obtained by reacting the above epoxy groups with secondary amines to form tertiary amino groups which are then neutralized with suitable acid.

The above cation-modified novolak type epoxy resin may also contain a primary hydroxyl group to enhance curing reactivity, or may contain a long chain alkyl group, such as a stearyl group, a dodecyl group or an octyl group for improving absorption to the former anionic polyester resin. These are carried out by reacting a secondary amine having a hydroxyl groups or a secondary amine having a long chain alkyl group with a portion of epoxy groups that are present in the above cation-modified novolak type epoxy resin. Beside of the above cation-modified novolak type epoxy resin, the cationic dispersing resin can be a graft resin of the cation-modified epoxy resin of the resin component B with a polyester resin or a poly ether resin. These can be carried out by using as polyester resin an alkoxy modified poly ε-caprolactone or alkoxy modified poly δvalerolactone etc. having a hydroxyl group at an end of its molecular chain, or a polyester resin an alkoxy modified polypropylene etc. having a hydroxyl group at an end of its molecular chain, which is reacted with diisocyanate, such as 4,4'-diphenylmethane diisocyanate, tolylene diisocyanate, hexamethylene diisocyanate and isoholon diisocyanate by a urethane bond, and then reacted with a hydroxyl group in the cation-modified epoxy resin.

A number average molecular weight of the above cationic dispersing resin is preferably within the range of 1,000 to 10,000. Molecular weights of less than 1,000 reduce the absorption to the resin component A and lower dispersion stability. If it is more than 10,000, the resin solution has a high viscosity and make it difficult to handle in operation, such as emulsification and dispersion of an obtained resin, as well as badly affects on appearance of an obtained electrocoated coating. In addition, high viscosity may cause reduction of layer separation property between the resin component A and the resin component B during heating and curing.

This cationic dispersing resin is dissolved or dispersed in an aqueous medium, and mixed by, for example, a homomixer or a disper, to which a pigment dispersion made of a pigment and the resin A is added dropwise to obtain an aqueous pigment dispersed paste. At this time, if necessary, a suitable amount of cationic surfactant or monovalent alcohol etc. may be added as dispersing auxiliary.

The resin component B is preferably emulsified and dispersed in water as an emulsion, as it is, or neutralized with a neutralizing agent in an amount enough to neutralize amino groups in each resin to be emulsified and dispersed in water as a cationized emulsion.

When the above curing agent is a combination of a blocked polyisocyanate and a melamine resin, it is preferred that, a mixture of the above resin component A and the melamine resin is used to carry out pigment dispersion, and separately the blocked polyisocyanate is mixed with the resin component B, both of which are mixed together to form an emulsion.

An example of the above neutralizing is inorganic acids, such as hydrochloric acid, nitric acid and phosphoric acid; and organic acids, such as formic acid, acetic acid, lactic acid, sulfamic acid and acetyl glycine acid. When the resin component B is emulsified, a suitable amount a corrosion-resistant of corrosion resistant agent may be added to the resin. The above corrosion-resistant agent can be aqueous acid salt of a rare earth metal, such as cerium, neodymium or praseodymium and/or an acid salt of zinc, because of a requirement in the market that toxic heavy metal, such as lead is not employed. For example, zinc acetate, cerium acetate, cerium carbonate, neodymium acetate or the like can be added during or after emulsifying The aqueous pigment dispersed paste thus obtained, the emulsion of the resin component B, a curing agent and additional components, such as UV absorbent, antioxidant, surfactant, smoothing agent for coating film surface, curing accelerate (organic tin compounds etc.) can be mixed to obtain an aqueous paint composition. Additionally, the curing agent, as described above, is preferably contained in at least one of the aqueous pigment dispersed paste and the emulsion.

The above aqueous paint composition is preferably controlled to have a solid content of 15 to 25 weight %. The controlling of the solid concentration is carried out by an aqueous medium, such as water or a mixture of water and hydrophilic organic solvent.

The method of the plural layered electrocoated coating of the present invention is one in which the aqueous paint composition thus obtained is electrocoated on an electrically conductive substrate. The electrically conductive substrate can be various one, but preferably is an automobile body or a parts thereof.

In the method of electrocoating, cationic electrocoating carried out by connecting the conductive substrate to a cathode electrode terminal is suitable. Concretely, a cathode electrode is connected to an electrically conductive substrate to be coated, and electrocoating is conducted in a bath containing the above mentioned aqueous paint composition at a bath temperature of 15–35° C. and an applied voltage of 100 to 400 Volt to form a film having dry film thickness of 10 to 50 $\mu$m, preferably 20 to 40 $\mu$m. It is then baked at 140 to 200° C., preferably 160 to 180° C. for 10 to 30 minutes. In the baking, there are a method putting the coated article in a heating equipment previously heated to an objective temperature or a method increasing the temperature after putting the coated article.

This heating leads the resin component A, the resin component B and a pigment dispersing resin contained in an electrocoated aqueous paint composition to be distributed between the side of atmosphere and the side of the electrically conductive substrate, depending on inherent solubility parameter of each resin. When a coated film is cured, an electrocoated and cured film of the double layered construction is formed, in which the resin component A is at the side directly contacting air and the resin component B is at the side directly contacting the electrically conductive substrate, furthermore the pigment being mainly present in the layer containing the resin component A.

In the plural layered electrocoated coating obtained in the present invention, in order to confirm the separating state of resin layers, there is a method in which a cross section of the electrocoated coating is visually observed with a video microscope, or a method in which it is observed with a scanning electron microscope (SEM). In order to identify the resin components constituting each resin layer, a total reflection type Fourier transform infrared spectrophotometer (FTIR-ATR) can be used, for example. Further, for confirming the presence of a specific pigment, such as titanium dioxide in each layer and a difference of the concentration between layers, a SEM-EDX analysis is useful.

In the method for forming the plural layered electrocoated coating of the present invention, when titanium dioxide is used as a pigment, the plural layered electrocoated cured film with white surface can be obtained. On the plural layered cured film, a functional clear paint or a top coating paint is coated and baked to form a multi layered coating in two-coat structure that is excellent in cohesiveness and appearance. The above clear paint and top coating paint may be any types, such as solvent type, aqueous type and powder.

In addition, it is preferred that the plural layered elecrocoated coating is coated with the functional clear paint or the top coating paint by wet-on-wet and both cured together with a two-coat-one bake coating method.

In this two-coat-one bake method, in order to obtain an objective multi layer coating film without damaging appearance of a coating, it is desired that a temperature generating layer separation in the electrocoated coating is determined at a temperature of less than the temperature required for the curing of the coating, preheating are carried out at a temperature of less than the curing temperature and a top coating is then provided. Preferably, the preheating is usually carried out at 60 to 130° C. for 2 to 20 minutes.

EXAMPLES

The present invention is further illustrated in detail as follow, with reference to Productive Examples, Examples, and Comparative Examples. In Examples, "parts" shows "weight part" and "%" shows "weight %".

<Productive Example 1 (Production of blocked polyisocyanate curing agent)>

In a reaction vessel equipped with an agitator, a nitrogen introduction tube, a condenser tube and a thermometer, 222 parts of isophorone diisocyanate was introduced and then diluted with 56 parts of methyl isobutyl ketone, to which 0.2 parts of butyl tin laurate was added and heated to 50° C., followed by adding 17 parts of methyl ethyl ketoxime while the content did not exceed 70° C. This was incubated at 70° C. for one hour until an absorption of an isocyanate residue in infrared absorption spectrum substantially disappeared. It was then diluted with 43 parts of n-butanol to obtain a blocked polyisocyanate having a solid content having a solid content of 70% (solubility parameter $\delta i$=11.8).

<Productive Example 2 (Production of blocked polyisocyanate curing agent)>

In a reaction vessel equipped with an agitator, a nitrogen introduction tube, a condenser tube and a thermometer, 199 parts of a trimmer of hexamethylene diisocyanate was introduced and diluted with 39 parts of methyl isobutyl ketone, to which 0.2 parts of butyltin laurate was added and heated to 50° C., followed by adding 44 parts of methyl ethyl ketoxime and 87 parts of ethyleneglycol mono-2-ethylhexyl ether while the content did not exceed 70° C. This was then incubated at 70° C. for one hour until an absorption of an isocyanate residue in infrared absorption spectrum substantially disappeared. It was then diluted with 43 parts of n-butanol to obtain a blocked polyisocyanate having a solid content of 80% (solubility parameter $\delta i$=10.7).

<Productive Example 3 (Production of cation-modified epoxy resin emulsion (resin component B))>

In a reaction vessel equipped with an agitator, a decanter, a nitrogen introduction tube, a thermometer and a dropping funnel, 2,400 parts of a bisphenol A type epoxy resin having an epoxy equivalent of 188 (DER-331 J, from Daw Chemical Co.), 141 parts of methanol, 168 parts of methyl isobutyl ketone, and 0.5 parts of dibutyltin dilaurate were poured. After stirring it at 40° C. to dissolve uniformly, 320 parts of 2,4–/2,6-tolylene diisocyanate (80/20 of weight ratio mixture) was added dropwise for 30 minutes to exotherm to 70° C. To the content, 5 parts of N,N-dimethylbenzylamine was added and heated to 130° C. and the reaction was continued at 130° C. for 3 hours with removing methanol until epoxy equivalent was 232. Further, 644 parts of methyl isobutyl ketone and 341 parts of bisphenol A were added, and a temperature within the system was kept at 130° C. to continue reaction until an epoxy equivalent was 840, which was then cooled until a temperature within the system was to 110° C. Then, a mixture of 241 parts of diethylenetriamine diketimine (solid content of 73% of methyl isobutyl ketone solution), 300 parts of N-methylethanolamine and 346 parts of di(2-ethylhexyl)amine was added and reacted at 120° C. for one hour to obtain a cation-modified epoxy resin. A number average molecular weight of this resin was 1800, a hydroxyl value was 160, a softening point was 130° C. according to a measurement according to JIS-K-5665. According to a measurement of infrared absorption spectrometry etc., it was identified that oxazolidone ring (absorbing wavenumber; 1750 cm$^{-1}$) was provided in a resin (solubility parameter $\delta b$=11.4.) Into the cation-modified epoxy resin thus obtained, 1,834 parts of the blocked polyisocyanate curing agent produced in the above productive example 1, 90 parts of acetic acid, 2 parts of zinc acetate and 2 parts of cerium acetate as corrosion-resistant agent were added. It was then diluted with ion exchanged water to a non-volatile content of 32%, which was then concentrated to a non-volatile content of 36% to obtain an aqueous emulsion that mainly consists of cation-modified epoxy resin (described as E-1 as follow).

<Productive Example 4 (Production of anionic polyester resin (resin component A))>

In a reaction vessel equipped with an agitator, a cooler, a decanter, a nitrogen introduction tube, a thermometer and a dropping funnel, 21.6 parts of neopenthyl glycol, 95.2 parts of trimethylolpropane, 328.5 parts of phthalic anhydride, 157.8 parts of isophthalic acid, 26.2 parts of 2,2'-dimethylolbutanoic acid, 0.6 parts of dibutyl tinoxide as reaction catalyst and 60 parts of xylene as reflux solvent were introduced and heated and kept at 150° C. under nitrogen atmosphere. Then, 598.5 parts of Cajurer-E-10 (from Shell Chemical. Co., monoepoxide having a branch alkyl (C-10)) was added dropwise from the dropping funnel for 30 minutes, and heated to 210 to 230° C. to dehydrate for 5 hours. Thereafter, 240 parts of methyl isobutyl ketone as dilution solvent was added.

The obtained anionic polyester resin solution had a solid content of 80% and had a number average molecular weight of 1,600, an acid value of 8, a hydroxyl value of 70, a solubility parameter $\delta a$ of 10.0.

<Productive Example 5 (Production of cationic dispersing resin)>

In a reaction vessel equipped with an agitator, a condenser tube, a nitrogen introduction tube and a thermometer, 122 parts of a cresol novolak type epoxy resin having an epoxy equivalent of 203 (Epototo YDCN-703, available from Toto Chem. Co.), 10 parts of diethanolamine, 74 parts of Farmine D86 (a mixture of dialkylamine having 14 to 18 carbon atoms, available from Kao Co.) and 52 parts of methyl isobutyl ketone were introduced and reacted at 120° C. under nitrogen atmosphere for one hour. After cooling it to 70° C., 48 parts of SH P-100 (1-(2-hydroxyethylthio)-2,3-propanediol, available from Sanyo Chem. Co.), 32 parts of glacial acetic acid and 80 parts of deionized water were added. The reaction mixture was kept at 70 to 75° C. for 6 hours to react.

The obtained cationic dispersing resin had a solid content of 60%, a number average molecular weight of 5,000, a solubility parameter $\delta c$ of 10.8.

<Productive Example 6(Production of cationic dispersing resin)>

To a reaction vessel, 500 parts of the cation-modified epoxy resin before being emulsified as described in Productive Example 3 and 208 parts of methyl isobutyl ketone were introduced and heated to keep at 115° C. under nitrogen atmosphere. Separately, a half blocked compound was obtained by reacting 300 parts of a methoxy modified poly-ε-caprolactone having a hydroxyl group at one end of a molecular chain (average molecular weight of 1,500, a reaction product obtained by adding methanol to ε-caprolactone and polymerizing), 33 parts of hexamethylene diisocyanate and 0.1 parts of dibutyltin laurate at 70° C. for 2 hours, 333 parts of which was added to the reaction vessel to conduct a graft reaction at 7⁰° C. for 2 hours.

The resutling grafted resin solution of the cation-modified epoxy resin and polyester resin had a solid contact of 80%, a number average molecular weight of 4,500 and a solubility parameter δc=10.6.

<Productive Example 7 (Production of an aqueous pigment dispersed paste)>

A pigment dispersion containing the anionic polyester resin obtained in Productive Example 4 was prepared by a sand mill from the following formulation.

| Ingredients | Parts |
|---|---|
| Polyester resin varnish of Productive Example 4 | 87.5 |
| Blocked Polyisocyanate curing agent produced in Productive example 2 | 30 |
| Titanium dioxide | 100 |

After 25 parts of the cationic dispersing resin solution obtained in Productive Example 5 and 2 parts of ethylene glycol mono-n-hexyl cellosolve were dispersed in 220 parts of ion exchanged water, 114 parts of the pigment dispersion obtained above was added dropwise thereto with stirring to obtain a dispersion having a non-volatile content of 32%. Then, this was concentrated at a reduced pressure to 36% to obtain an aqueous pigment dispersed paste (described as P-1 as follow).

<Productive Example 8 (Production of an aqueous pigment dispersed paste)>

A pigment dispersion containing the anionic polyester resin obtained in Productive Example 4 was prepared by a sand mill from the following formulation

| Ingredients | Parts |
|---|---|
| Polyester resin varnish of Productive Example 4 | 87.5 |
| Melamine resin curing agent (Yuban ZON 60, available from Mitsui Chemical Co.) | 30 |
| Titanium dioxide | 100 |

After 25 parts of the cationic dispersing resin solution obtained in Productive Example 5 and 2 parts of ethylene glycol mono-n-hexylcellosolve were dispersed in 230 parts of ion exchanged water, 114 parts of pigment dispersion obtained above was added dropwise thereto with stirring to obtain a dispersion having a non-volatile content of 32%, which was concentrated at a reduced pressure to 36% to obtain an aqueous pigment dispersed paste (described as P-2 as follow).

<Productive Example 9 (Production of an aqueous pigment dispersed paste)>

A pigment dispersion containing the anionic polyester resin obtained in Productive Example 4 was prepared by a sand mill from the following formulation.

| Ingredients | Parts |
|---|---|
| Polyester resin varnish of Productive Example 4 | 87.5 |
| Blocked polyisocyanate curing agent produced in Productive Example 2 | 40 |
| Titanium dioxide | 100 |

After 25 parts of the cationic dispersing resin solution obtained in Productive Example 8and 2 parts of ethyleneglycol mono-n-hexylcellosolve were dispersed in 220 parts of ion exchanged water, 114 parts of the pigment dispersion obtained above was added dropwise thereto with stirring to obtain a dispersion hewing a non-volatile content of 32%, which was concentrated at reduced pressure to 36% to obtain an aqueous pigment dispersed paste (described as P-3 as follow).

<Productive Example 10 (Production of an aqueous pigment dispersed paste)>

After 30 parts of the cationic dispersing resin solution obtained in Productive Example 5 and 2 parts of ethyleneglycol mono-n-hexylcellosolve were dispersed in 102 parts of ion exchanged water, 100 parts of titanium dioxide was then added and dispersed by using a sand mill. As a result, an aqueous pigment dispersed paste of having a non-volatile content of 56% was obtained (described as P4 as follow).

<Productive Example 11 (Production of an anionic polyester resin emulsion)>

After 50 parts of cationic dispersing resin solution obtained in Productive Example 5 and 4 parts of ethyleneglycol mono-n-hexylcellosolve previously were dispersed in 220 parts of ion exchange water, a mixture of 87.5 parts of the anionic polyester resin obtained in Productive Example 4 and 40 parts of the blocked polyisocyanate curing agent obtained in Productive Example 2 was added dropwise with stirring to obtain a dispersion having a non-volatile content of 32%. This was then concentrated to a non-volatile content of 36% at a reduced-pressure to obtain an anionic polyester resin emulsion of which a surface was coated with the cationic dispersing resin (described as E-2 as follow).

<Examples 1 to 5 and Comparative Example 1>

The cation-modified epoxy resin emulsion (E-1) obtained in Productive Example 3, the anionic polyester resin emulsion (E-2) obtained in Productive Example 11, the aqueous pigment dispersed pastes (P-1 to P-4) obtained in Productive Example 7 to 10 and deionized water were used to prepare an aqueous paint compositions having a solid content of 20%.

In the paint composition, an emulsion paste of dibutyltin oxide as curing accelerator was added so as to have a tin content of 1.5% based on a solid content of the paint. Formulations of each materials, mixing ratios (a ratio of resin solid, calculated except for a weight of curing agent) and PN rations of pigment/resin vehicles (weights of total vehicles, containing a weight of curing agent) are shown in Tables 1 and 2 below. Additionally, in each Table, δa, δb, δc, δi and δm are respectively solubility parameters of the above resin component A, the above resin component B, the cationic dispersing resin, the polyisocyanate and the melamine resin.

TABLE 1

| Example No. | Example 1 | Example 2 | Example 3 | Example 4 | Example 5 | Comparative Example 1 |
|---|---|---|---|---|---|---|
| Resin emulsion | E-1 | E-1 | E-1 | E-1 | E-1 | E-1 & E-2 |
| Aqueous pigment dispersed paste | P-1 | P-1 | P-1 | P-2 | P-3 | P-4 |
| Mixing ratio of resins (A/B) | 50/50 | 50/50 | 50/50 | 50/50 | 50/50 | 50/50 |
| SP* | | | | | | |
| δa | 10 | 10 | 10 | 10 | 10 | 10 |
| δb | 11.4 | 11.4 | 11.4 | 11.4 | 11.4 | 11.4 |
| δb−δa | 1.4 | 1.4 | 1.4 | 1.4 | 1.4 | 1.4 |
| δc | 10.8 | 10.8 | 10.8 | 10.8 | 10.6 | 10.8 |
| δi | 10.7 | 10.7 | 10.7 | — | 10.7 | 10.7 |
| δm | — | — | — | 10 | — | — |
| δm−δa | — | — | — | 0 | — | — |
| P/V | 1/3 | 1/3 | 1/3 | 1/10 | 1/2 | 1/3 |

*SP = Solubility Parameter

The aqueous paint compositions according to the formulations of the above Examples were used to electrocoat on a steel board treated with zinc phosphate at such a voltage that a thickness of the electrocoated coating after baking was 20 μm, which was then baked for at 160° C. 15 minutes. The evaluation results to the obtained electrocoated coatings are shown in Table 2.

TABLE 2

| | Example 1 | Example 2 | Example 3 | Example 4 | Example 5 | Comparative Example 1 |
|---|---|---|---|---|---|---|
| Structure of electrocoated film | Two layered separation | Two layered separation | Two layered separation | Two layered separation | Two layered separation | Two layered separation |
| Relationship of relative concentration of pigment of each layer | b ≈ 0 | a > b | b ≈ 0 | a > b | a > b | a = b |
| SWM1000H | 90% | 85% | 90% | 80% | 89% | 30% |
| SDT | 0.1 mm | 0.1 mm | 0.2 mm | 0.1 mm | 0.1 mm | 3.5 mm |
| Adhesion to top coating | 100/100 | 100/100 | 100/100 | 100/100 | 100/100 | 100/100 |
| Roughness of electrocoated coating (Ra) | 0.09 | 0.07 | 0.08 | 0.05 | 0.1 | 0.25 |
| Distinguishness of a multi layered coating (NSIC*) | 39 | 38 | 37 | 35 | 40 | 20 |

Each item in Table 2 is explained.

<Layer separating states of electrocoated films>

Visual observation of a cross section was carried out with a video microscope. When two layered separation was observed, a main resin constituting each resin layer was identified by FTIR-ATR analysis.

In FTIR-ATR analysis, two layered separation was judged as follow. In a surface layer of a sample of a cured film, i.e. a resin layer directly contact air, an absorption belonging to ester bond originating from the resin component A (absorption wave number; 1720, 1280 and 1070 cm$^{-1}$) was confirmed and an absorption belonging to oxazolidone ring originating from the resin component B (absorption wave number; 1750 cm$^{-1}$) was few confirmed, while in the lower layers of the above sample, i.e. the resin layers directly contacting a conductive i substrate, an absorption characterized in oxazolidone ring originating from the resin component B (same wave number with above description) was confirmed and the absorption belonging to ester bond originating from the resin component A (same wavenumber with above description) was few confirmed.

<Relationship of relative concentration of pigment of each layer>

The relationship of relative pigment content of titanium dioxide in each layer was judged from a distribution of a titanium atom according to SEM-EDX (fluorescence X-rays analysis with scanning electron microscope).

<SWH1000H>

A coated board was attached to a Sunshine weather-o-meter, and irradiated for 1,000 hours. It was then subjected to measure, 60° C. gross to find a retention based on initial value. If peeling off between layers is generated, that is recorded.

<SDT>

A coating was cross-cut to reach to a board with a knife, salt water spraying test (5% salt water, 55° C. ) was carried out for 480 hours. SDT was shown by a maximum width of a portion peeled off with an adhesive tape from both sides of the cutting portion <Adhesion to top coating>

On a cured electrodeposited coating having 20 μm in thickness, an alkyd type top coating paint (Orgaselect silver, availabe from Nippon Paint Co.) was spray-coated in a dry thickness of 25 to 30 μm and baked at 140° C. for 20 minutes. 100 Crosscuts having 1 mm×1 mm were formed, on which an adhesive tape was adhered. The tape was rapidly peeled off and number of crosscuts remaining on the coated surface was recorded.

<Distinguishness of a multi layered coating (NSIC*)>

A functional clear paint (Nippe Superfulon, fluorine resin-containing clear paint, available from Nippon Paint Co.) was spray-coated in a dry thickness of 30 μm on a cured electrocoated coating having 20 μm in thickness, and baked at 140° C. for 20 minutes. Distinguishness was measured with a portable deistinguishness measuring instrument (HA-NSIC, from Suga Testing Machine Co.).

According to the above Examples and Comparative Example, it is clear that the aqueous paint compositions of the present Examples can be a plural layered electrodeposited coating having excellent corrosion resistance, adhesion and smoothness of surface. And the multi layered coating formed by directly top-coating on the electrocoated coating has excellent distinguishness in spite of an intermediate coating-less system.

<Example 6>

The two layered electrocoated uncured coatings formed in examples 1, 3 and 5 (which had been electrocoated in such a thickness that a cured film had a thickness of 20 μm) were preheated at 120° C. for 5 minutes, on which a metallic base paint (Superlack M-115 silver, from Nippon Paint Co.) and an acid rain resistant clear paint (Nippe Macflow O-380, from Nippon Paint Co.) were coated in a dry thickness of 15 μm and 30 μm, respectively, and the electrocoated coating and the top coated coating film were baked simultaneously at 150° C. for minutes. Distinguishness of each multi layer coating film (NSIC*) was 40 for Example 1, 42 for Example 3 and 45 for Example 5, which were all excellent. It was also confirmed by an observation of the cross section of coating that, by the preheating at 120° C. for 5 minutes, the electrodeposited coating had a complete layer separation with uncuring.

TECHNICAL EFFECTS

In the method for forming the plural layered electrodeposited coating of the present invention, pigment concentration is controlled or distributed such that a pigment concentration (a) in a resin layer directly contacting air is relatively higher than a pigment concentration (b) in a resin layer directly contacting an electrically conductive substrate, in at least two types of resin components which are insoluble with each other. According to this method, an intermediate-coating-less method can be carried out with keeping good appearance, weather resistance and corrosion resistance equal to a conventional three layered coating method.

In addition, a solubility parameter ($\delta a$) of the resin component A constituting a resin layer directly contacting air and a solubility parameter ($\delta b$) of the resin component B constituting a resin layer directly contacting an electrically conductive substrate are controlled to ($\delta b - \delta a$)$\geq 1.0$, and thereby the above two resin components which are insoluble with each other generate a layer separation to form a plural layered electrodeposited coating after electrocoating and heating. And, if the above resin component constituting a resin layer directly contacting an electrically conductive substrate is a cation-modified epoxy resin, the resin moves to the conductive substrate during the above layer separation because this resin has affinity with hydrophilic group, such as hydroxyl group, whereby weather resistance, corrosion resistance and solvent resistance appear. If the resin component that is insoluble with the above cation-modified epoxy resin component is anionic polyester resin, an electrocoated coating having sufficient thickness can be provided in comparison with use of non-ionic resin.

Moreover, a pigment represented by titanium dioxide described above is dispersed in a resin constituting a resin layer directly contacting air represented by anionic polyester resin, and made to be an aqueous dispersed paste by cationic dispersing resin whose solubility parameter ($\delta c$) is controlled between $\delta a$ and $\delta b$, and thereby the pigment is mainly contained in a resin layer directly contacting air during the above layer separation with the flow of polyester resin, whereby particularly high weather resistance, corrosion resistance and solvent resistance are obtained.

And, if a blocked polyisocyanate is used as the above curing agent, and if a solubility parameter ($\delta i$) of the polyisocyanate is controlled between the above solubility parameters $\delta a$ and $\delta b$, each layer of the formed plural layered electrocoated coating can be cured uniformly.

Melamine resin is particularly used as a curing agent for a resin layer directly contacting air, and a difference between a solubility parameter ($\delta m$) of melamine resin and $\delta a$ is made less than 0.5, while a blocked polyisocyanate is used as a curing agent for a layer which is directly contacting an electrically conductive substrate, and a difference between a solubility parameter ($\delta i$) of the blocked polyisocyanate and $\delta b$ is made less than 0.5, whereby the melamine resin is mainly contained in the layer directly contacting air and the blocked polyisocyanate is mainly contained in the layer which is directly contacting an electrically conductive substrate, whereby curing property can be improved in each layer.

A top coating paint is coated on the plural layered electrocoated coating obtained by the above forming method and then baked to form a multi-layered coating which has excellent appearance, cohesiveness to a top coating layer, weather resistance and corrosion resistance superior or equal to the conventional two coat system. Accordingly, the method of the present invention plays an important roll in paint industry, especially in the field of automobile coating, for structuring a novel coating system which achieves step decrease of intermediate-coating-less, cost reduction and less damage to environment (VOC and HAPs).

What is claimed is:

1. A method for forming a plural layered electrodepositied coating, comprising;
    electrocoating an aqueous paint composition comprising at least two sort of resins which are insoluble with each other, a curing agent and a pigment, on an electrically conductive substrate,
    heating it to form a layer separation, and then
    curing to form a plural layered cured coating having at least two layers,
    wherein a concentration of the pigment is distributed such that a pigment concentration (a) in the resin layer directly contacting air is relatively higher than a pigment concentration (b) in the resin layer directly contacting said electrically conductive substrate.

2. The method for forming the plural layered electrodeposited coating according to claim 1 wherein said electrocoating is cation-electrocoating in which the electrically conductive substrate is connected with a cathode electrode.

3. The method for forming the plural layered electrodeposited coating according to claim 1 characterized in that a solubility parameter ($\delta a$) of the resin component constituting said resin layer directly contacting air and a solubility parameter ($\delta b$) of the resin component constituting said resin layer which directly contacting the electrically conductive substrate have a relation of ($\delta b - \delta a$)$\geq 1.0$.

4. The method for forming the plural layered electrodeposited coating according to claim 3 characterized in that said curing agent is a blocked polyisocyanate and has a solubility parameter ($\delta i$) between said solubility parameters $\delta a$ and $\delta b$.

5. The method for forming the plural layered electrodepositied coating according to claim 3 characterized in that said curing agent is composed of two curing agents having different solubility parameter, one is a melamine resin, a difference between its solubility parameter ($\delta m$) and said solubility parameter ($\delta a$) being less than 0.5, and the other is a blocked polyisocyanate, a difference between its solubility parameter ($\delta i$) and said solubility parameter ($\delta b$) being less than 0.5.

6. The method for forming the plural layered electrodeposited coating according to claim 1 characterized in that said resin component constituting the resin layer directly contacting the electrically conductive substrate is a cation-modified epoxy resin.

7. The method for forming the plural layered electrodeposited coating according to claim 1 wherein said resin component constituting the resin layer directly contacting air is an anionic polyester resin.

8. The method for forming the plural layered electrodeposited coating according to claim 7 wherein said anionic polyester resin contains a tertiary carboxyl group in a molecule.

9. The method for forming the plural layered electrodeposited coating according to claim 1 characterized in that a weight ratio of said resin component constituting the resin layer directly contacting air and said resin component constituting the resin layer directly contacting the electrically conductive substrate in said aqueous paint composition is within the range of 70/30 to 30/70 by weight.

10. The method for forming the plural layered electrodeposited coating according to claims 1 characterized in that a ratio (P/V) of a weight of total vehicle component forming the plural layered electrodeposited coating except the pigment (V), to a weight of total pigment in the said plural layered electrodeposited coating (P) is within the range of 1/10 to 1/2.

11. The method for forming the plural layered electrodeposited coating according to claim 1 characterized in that at least one of said pigment is titanium dioxide.

12. The method for forming the plural layered electrodeposited coating according to claim 1 characterized in that said aqueous paint composition is obtained by dispersing the pigment by using the resin component constituting the resin layer directly contacting air to obtain a pigment dispersion which is then dispersed is an aqueous medium containing a cationic pigment-dispersing resin to form an aqueous pigment-dispersed paste, and then mixing the aqueous pigment dispersed paste with the curing agent and the resin component constituting the resin layer directly contacting the electrically conductive substrate.

13. The method for forming the plural layered electrodeposited coating according to claim 12 characterized in that a solubility parameter ($\delta c$) of said cationic pigment dispersing resin is present between $\delta a$ and $\delta b$.

14. The method for forming the plural layered electrodeposited coating according to claim 12 characterized in that said cationic pigment dispersing resin is a cation-modified novolak epoxy resin.

15. A method for forming a multi-layered coating characterized in that, on the plural layered electrodeposited coating obtained according to claim 1 a functional clear paint or top coating paint is coated and baked.

16. The method for forming the multi-layered coating according to claim 15 characterized in that, said plural layered electrodeposited coating is uncured but preheated at a temperature of less than the temperature required for the curing of the plural layer electrodeposited coating, and then coating the functional clear paint or top coating paint in wet-on-wet, followed by baking the electropainted coating and the top coating simultaneously.

* * * * *